US012700650B2

(12) United States Patent
Sakurai et al.

(10) Patent No.: US 12,700,650 B2
(45) Date of Patent: Aug. 4, 2026

(54) ELECTRODE TERMINAL AND SECONDARY BATTERY PROVIDED WITH SAID ELECTRODE TERMINAL

(71) Applicant: PRIME PLANET ENERGY & SOLUTIONS, INC., Tokyo (JP)

(72) Inventors: Takahiro Sakurai, Nagoya (JP); Kosuke Suzuki, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 666 days.

(21) Appl. No.: 17/579,885

(22) Filed: Jan. 20, 2022

(65) Prior Publication Data

US 2022/0247044 A1     Aug. 4, 2022

(30) Foreign Application Priority Data

Feb. 1, 2021     (JP) .................................. 2021-14604

(51) Int. Cl.
　*H01M 50/562*　　(2021.01)
　*H01M 50/557*　　(2021.01)
　*H01M 50/564*　　(2021.01)

(52) U.S. Cl.
　CPC ....... *H01M 50/562* (2021.01); *H01M 50/557* (2021.01); *H01M 50/564* (2021.01)

(58) Field of Classification Search
　None
　See application file for complete search history.

(56) References Cited

U.S. PATENT DOCUMENTS

| | | | |
|---|---|---|---|
| 6,013,388 A * | 1/2000 | Stadnick ............. | H01M 10/653 |
| | | | 429/178 |
| 6,030,723 A | 2/2000 | Nagano et al. | |
| 6,071,557 A | 6/2000 | Haraguchi et al. | |
| 9,680,136 B2 | 6/2017 | Yoo et al. | |
| 2006/0073379 A1 | 4/2006 | Kim et al. | |
| 2009/0011330 A1 | 1/2009 | Onodera et al. | |
| 2014/0036413 A1 | 2/2014 | Hagiwara et al. | |
| 2014/0038005 A1 | 2/2014 | Yamato et al. | |
| 2014/0205895 A1* | 7/2014 | Kim .................. | H01M 50/1245 |
| | | | 429/163 |
| 2016/0254517 A1 | 9/2016 | Tsunaki et al. | |

(Continued)

FOREIGN PATENT DOCUMENTS

| | | |
|---|---|---|
| CN | 103578794 A | 2/2014 |
| CN | 105830253 A | 8/2016 |

(Continued)

OTHER PUBLICATIONS

Machine Translation of JP-05109400-A (Year: 2024).*
Kaken Tech conductive adhesive.*

*Primary Examiner* — Brian R Ohara
*Assistant Examiner* — Quintin D. Elliott
(74) *Attorney, Agent, or Firm* — Finnegan, Henderson, Farabow, Garrett and Dunner, LLP

(57)　　　　ABSTRACT

The present disclosure provides an electrode terminal with high conductivity and high junction strength. The electrode terminal disclosed herein includes a metallic first member and a metallic plate-shaped second member, wherein the first member has a connecting portion to be connected to the second member, and the connecting portion of the first member is bonded to one surface of the second member by a conductive adhesive.

12 Claims, 5 Drawing Sheets

(56)       References Cited

U.S. PATENT DOCUMENTS

| | | | |
|---|---|---|---|
| 2017/0229700 A1 | 8/2017 | Matsumoto et al. | |
| 2019/0044107 A1 | 2/2019 | Ito | |
| 2019/0053383 A1 | 2/2019 | Sato et al. | |
| 2019/0109315 A1* | 4/2019 | Hagino | H01M 10/0525 |
| 2019/0326719 A1* | 10/2019 | Park | H01R 4/64 |
| 2020/0035964 A1* | 1/2020 | Zhang | H01M 50/55 |

FOREIGN PATENT DOCUMENTS

| | | | |
|---|---|---|---|
| CN | 106575741 A | 4/2017 | |
| CN | 108701804 A | 10/2018 | |
| EP | 3062370 A1 * | 8/2016 | B23K 26/32 |
| GB | 2554860 A | 4/2018 | |
| JP | 03-166284 A | 7/1991 | |
| JP | 05109400 A * | 4/1993 | Y02E 60/10 |
| JP | H 10-321199 A | 12/1998 | |
| JP | 2015-156597 A | 8/2015 | |
| JP | 6093874 B2 | 3/2017 | |
| JP | 2017-183664 A | 10/2017 | |
| JP | 2019-040774 A | 3/2019 | |
| JP | 6836720 B2 | 3/2021 | |
| WO | WO 2007/145392 A1 | 12/2007 | |
| WO | WO 2012/147782 A1 | 11/2012 | |

* cited by examiner

ELECTRODE TERMINAL AND SECONDARY BATTERY PROVIDED WITH SAID ELECTRODE TERMINAL

CROSS-REFERENCE TO RELATED APPLICATIONS

The present application claims priority on the basis of Japanese Patent Application No. 2021-14604 filed in Japan on Feb. 1, 2021, the entire contents of which are incorporated herein by reference.

BACKGROUND

1. Technical Field

The present disclosure relates to an electrode terminal and to a secondary battery provided with the electrode terminal.

2. Description of the Background

Secondary batteries such as lithium-ion secondary batteries are capable of producing high energy density despite being lightweight and are therefore widely used as portable power supplies of personal computers, portable terminals, and the like as well as vehicle-mounted power supplies of BEVs (battery electric vehicles), HEVs (hybrid electric vehicles), PHEVs (plug-in hybrid electric vehicles), and the like.

With a secondary battery, various conductive members are joined to realize a conduction path in order to conductively connect a power generation element inside a battery case to the outside of the battery case or to electrically connect cells to each other. For example, Japanese Patent Application Publication No. 2017-183664 discloses connecting electrode terminals to each other using an anisotropic conductive adhesive containing a hardening resin and conductive particles in order to conductively connect the electrode terminals to each other. In addition, Japanese Patent Application Publication No. 2015-156597 discloses a configuration in which an electrode and an external terminal are connected using a conductive adhesive. Furthermore, U.S. Pat. No. 9,680,136 discloses electrically connecting two members by welding a boundary between the two members.

SUMMARY

The present inventors are considering adopting an electrode terminal in which a plurality of metallic members (for example, two metallic members) are joined as an electrode terminal for conductively connecting a power generation element inside a battery case of a secondary battery to the outside of the battery case. In such an electrode terminal, conductivity and junction strength between the members are desirably high.

The present disclosure has been made in consideration of the problem described above and a main object thereof is to provide an electrode terminal with high conductivity and high junction strength. In addition, another object of the present disclosure is to provide a secondary battery provided with the electrode terminal.

In order to realize the object described above, the present disclosure provides an electrode terminal in which members are connected to each other by a conductive adhesive.

Specifically, the electrode terminal disclosed herein includes a metallic first member and a metallic plate-shaped second member, wherein the first member has a connecting portion to be connected to the second member, and the connecting portion of the first member is bonded to one surface of the second member by a conductive adhesive. According to the electrode terminal with such a configuration, since the first member and the second member are bonded to each other by an adhesive with conductivity, high conductivity and high junction strength can be realized.

In a preferable aspect of the electrode terminal disclosed herein, one surface of the second member has an insertion hole into which at least a part of the connecting portion of the first member is inserted, an inner peripheral surface of the insertion hole is provided with a dent, a part of the connecting portion of the first member is fitted into the dent of the insertion hole, and a gap between the dent of the insertion hole and the part of the connecting portion of the first member that is fitted into the dent is filled with the conductive adhesive. According to such a configuration, when a part of the connecting portion of the first member is fitted into the dent provided on the inner peripheral surface of the insertion hole of the second member, since a gap that may inevitably be created between the members can be filled with the conductive adhesive, further high conductivity and junction strength can be realized.

In another preferable aspect of the electrode terminal disclosed herein, one surface of the second member is provided with a recessed portion filled with the conductive adhesive. According to such a configuration, since the conductive adhesive can be arranged in a sufficient amount at a desired position, junction strength is further improved.

In addition, in another preferable aspect of the electrode terminal disclosed herein, at least a part of the connecting portion of the first member is joined to one surface of the second member by metallic joining. According to such a configuration, further superior junction strength and conductivity can be realized.

In addition, in another preferable aspect of the electrode terminal disclosed herein, one surface of the second member is provided with a recessed portion filled with the conductive adhesive on an outer side than the portion joined by the metallic joining. According to such a configuration, since thermal conductivity of a thermosetting resin is lower than that of metal, heat when welding an external terminal such as a busbar to the electrode terminal is less readily transferred to a metallic joining portion. As a result, deterioration of the metallic joining portion due to heat can be suppressed and high junction strength and high conductivity can be maintained.

Furthermore, in another preferable aspect of the electrode terminal disclosed herein, the first member and the second member are constituted of metals that differ from each other. The conductive adhesive is capable of providing a strong bond even between two members constituted of metals that differ from each other and is capable of realizing high conductivity. Therefore, an electrode terminal which has high conductivity and high junction strength and in which two members constituted of different metals are connected to each other can be realized. Accordingly, since a metallic species of the electrode terminal can be appropriately changed to a same metallic species as another metallic member to be connected to the electrode terminal, connectivity with the other member can be improved.

In addition, in another preferable aspect of the electrode terminal disclosed herein, the conductive adhesive contains a conductive material and a thermosetting resin. According to such a configuration, high junction strength can be realized as the thermosetting resin contained in the conductive adhesive is hardened by a heat treatment.

In addition, in an aspect containing the conductive material, metal microparticles are favorably contained as the conductive material. Accordingly, further high conductivity can be realized.

Furthermore, in an aspect containing the metal microparticles, the metal microparticles are favorably at least one selected from the group consisting of silver, copper, nickel, aluminum, and gold. Accordingly, further preferable conductivity can be realized.

Furthermore, in another preferable aspect of the electrode terminal disclosed herein, the thermosetting resin is at least one selected from the group consisting of epoxy resin, urethane resin, silicone resin, and thermosetting acrylic resin. Accordingly, superior junction strength can be realized.

In addition, as another aspect of the technique disclosed herein, a secondary battery including the electrode terminal disclosed herein is provided. Specifically, a secondary battery disclosed herein includes: an electrode body including a positive electrode and a negative electrode; a battery case housing therein the electrode body; and a positive electrode terminal and a negative electrode terminal electrically connected to the positive electrode and the negative electrode of the electrode body, respectively, wherein at least one of the positive electrode terminal and the negative electrode terminal is constituted of the electrode terminal disclosed herein. Accordingly, a secondary battery including an electrode terminal with high conductivity and high junction strength can be provided.

DETAILED DESCRIPTION

Figure 1:
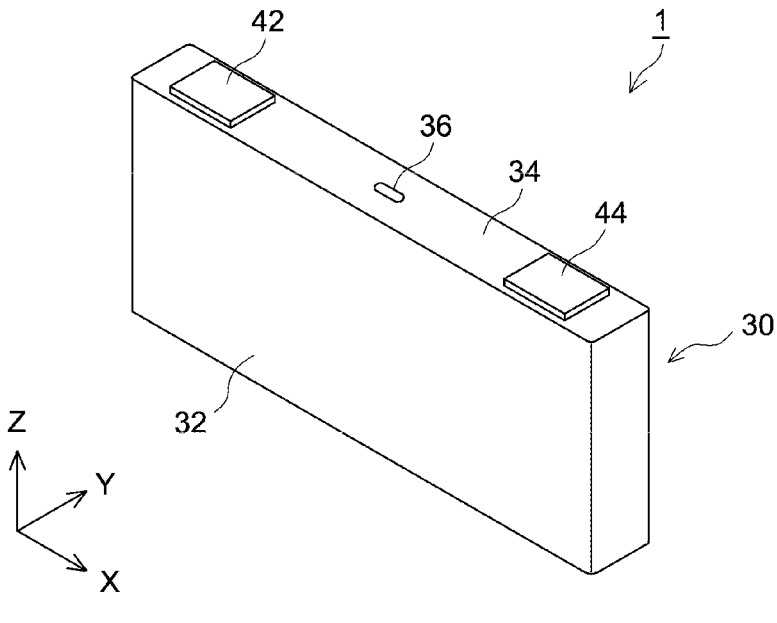
FIG. 1 is a perspective view schematically showing a secondary battery according to an embodiment.

Hereinafter, embodiments of the technique disclosed herein will be described with reference to the drawings. It should be noted that, in the following drawings, members and portions that produce the same effects will be described using the same reference characters. It should also be noted that dimensional relationships (a length, a width, a thickness, and the like) shown in the respective drawings do not reflect actual dimensional relationships. Matters required to carry out the present disclosure, with the exception of matters specifically mentioned in the present specification, may be understood to be design matters of a person with ordinary skill in the art based on the prior art in the relevant technical field.

In the drawings of the present specification, a reference character X denotes a "width direction", a reference character Y denotes a "depth direction", and a reference character Z denotes a "height direction". However, it should be noted that such directions have been determined for the sake of illustration and are not intended to limit modes of installation of batteries. In addition, a numerical value range described as A to B (where A and B are arbitrary numerical values) in the present specification is to be interpreted in a similar manner to a general interpretation and is to mean A or more and B or less.

In the present specification, a "secondary battery" refers to repetitively chargeable/dischargeable power storage devices in general and encompasses so-called storage batteries (in other words, chemical batteries) such as a lithium-ion secondary battery, a nickel hydride battery, and a nickel-cadmium battery as well as capacitors (in other words, physical batteries) such as an electrical double layer capacitor. In addition, a secondary battery disclosed herein can be used in the form of an assembled battery in which a plurality of the secondary batteries are electrically connected to each other.

Figure 2:
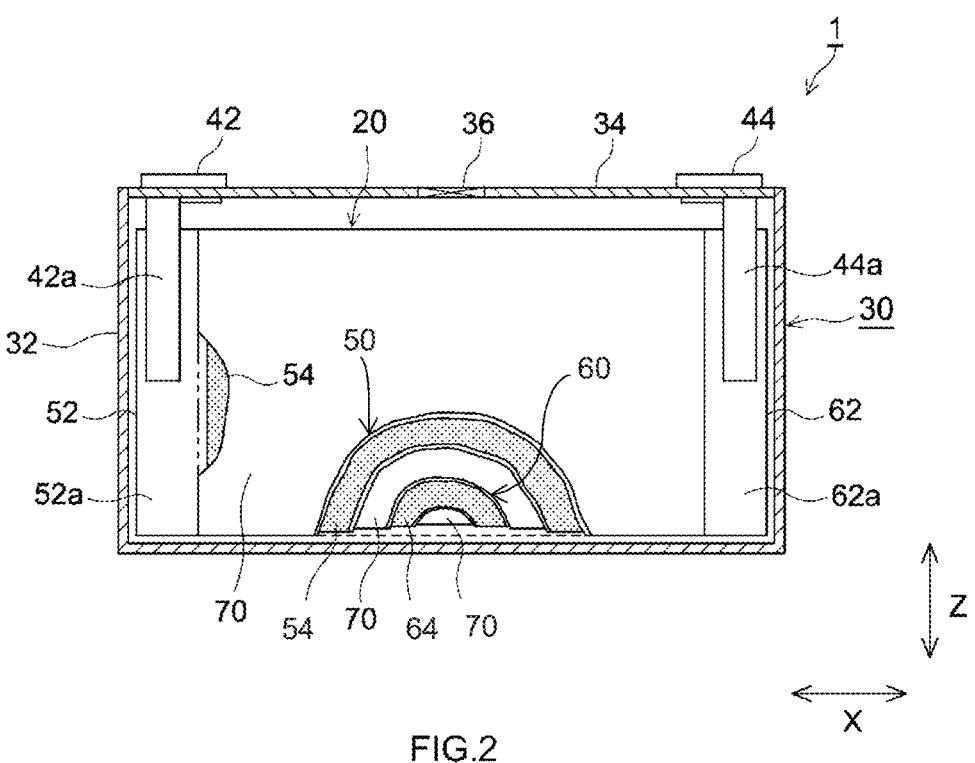
FIG. 2 is a partial breakaway view schematically showing a structure of the secondary battery according to the embodiment.

Hereinafter, an embodiment of a secondary battery including an electrode terminal disclosed herein will be described. FIG. 1 is a perspective view schematically showing a secondary battery 1 according to the embodiment. In addition, FIG. 2 is a partial breakaway view schematically showing a structure of the secondary battery 1 according to the embodiment. As shown in FIGS. 1 and 2, the secondary battery 1 includes an electrode body 20, an electrolyte (not illustrated), a battery case 30, a positive electrode terminal (a positive electrode external terminal 42 and a positive electrode internal terminal 42a), and a negative electrode terminal (a negative electrode external terminal 44 and a negative electrode internal terminal 44a).

The battery case 30 is a container which houses the electrode body 20 and the electrolyte. As shown in FIG. 1, the battery case 30 according to the present embodiment is a square container with a hexahedron box shape. However, the shape of the battery case 30 may be a box shape that is not a square (for example, a bottomed cylindrical box shape). The battery case 30 according to the present embodiment includes a square case main body 32 of which an upper surface is opened and a plate-shaped lid 34 which closes an opening of the case main body 32. The opening of the case main body 32 and an edge of the lid 34 is sealed by laser welding or the like. As shown in FIG. 2, the battery case 30 (in this case, the lid 34) is provided with a safety valve 36 that releases internal pressure inside the battery case 30 when the internal pressure rises to or exceeds a prescribed level. In addition, the lid 34 is provided with a terminal insertion hole 34a (refer to FIG. 3) at two locations. The positive electrode external terminal 42 is inserted into one terminal insertion hole 34a and the negative electrode external terminal 44 is inserted into the other terminal insertion hole 34a. As a material of the battery case 30, a metallic material with required strength is used and, for example, a lightweight metallic material with good thermal conductivity such as aluminum, stainless steel, or nickel-plated steel is used.

The electrode body 20 is a power generation element housed inside the battery case 30 in a state of being covered by an insulating film (not illustrated) or the like. The electrode body 20 according to the present embodiment includes an elongated sheet-shaped positive electrode 50, an elongated sheet-shaped negative electrode 60, and an elongated sheet-shaped separator 70. The electrode body 20 is a wound electrode body in which the elongated sheet-shaped members described above are wound in layers. It should be noted that the structure of the electrode body is not particularly limited and various structures that may be adopted in a general secondary battery can be adopted. For example, the electrode body may be a laminated electrode body in which a positive electrode sheet and a negative electrode sheet with rectangular shapes are laminated via a separator sheet.

The positive electrode 50 includes a foil-shaped positive electrode current collector 52 (for example, aluminum foil) and a positive electrode active material layer 54 formed on a surface (one surface or both surfaces) of the positive electrode current collector 52. In addition, in one side edge portion (a left-side side edge portion in FIG. 2) of the positive electrode 50 in the width direction X, the positive electrode active material layer 54 is not formed but a positive electrode current collector-exposed portion 52a is formed in which the positive electrode current collector 52 is exposed. The positive electrode internal terminal 42a is joined to the positive electrode current collector-exposed portion 52a, and the positive electrode internal terminal 42a is connected to the positive electrode external terminal 42. Accordingly, conduction between the inside and the outside of the battery case 30 is realized.

The positive electrode active material layer 54 includes a positive electrode active material and may also include various materials such as a binder and a conductive material when necessary. Regarding the materials included in the positive electrode active material layer, materials that may be used in a conventional general secondary battery can be used without any particular limitations, and since the materials included in the positive electrode active material layer do not limit the technique disclosed herein, a detailed description thereof will be omitted.

The negative electrode 60 includes a foil-shaped negative electrode current collector 62 (for example, copper foil) and a negative electrode active material layer 64 formed on a surface (preferably, both surfaces) of the negative electrode current collector 62. In addition, in a side edge portion (a right-side side edge portion in FIG. 2) on an opposite side to the positive electrode current collector-exposed portion 52a of the negative electrode 60 in the width direction X, the negative electrode active material layer 64 is not formed but a negative electrode current collector-exposed portion 62a is formed in which the negative electrode current collector 62 is exposed. The negative electrode internal terminal 44a is joined to the negative electrode current collector-exposed portion 62a, and the negative electrode internal terminal 44a is connected to the negative electrode external terminal 44. Accordingly, conduction between the inside and the outside of the battery case 30 is realized.

The negative electrode active material layer 64 includes a negative electrode active material and may also include various materials such as a binder when necessary. Regarding the materials included in the negative electrode active material layer, in a similar manner, materials that may be used in a conventional general secondary battery can be used without any particular limitations, and since the materials included in the negative electrode active material layer do not limit the technique disclosed herein, a detailed description thereof will be omitted.

The separator 70 is interposed between the positive electrode 50 and the negative electrode 60 and prevents the electrodes from coming into direct contact with each other. While a resin sheet (for example, polyethylene or polypropylene) or the like having required heat resistance is used as the separator 70, since a separator that may be used in a conventional general secondary battery can be used as the separator 70 without any particular limitations, a detailed description thereof will be omitted.

As an electrolyte (not illustrated) housed in the battery case 30, electrolytes that may be used in a conventional general secondary battery can be used without any particular limitations and, for example, while the electrolyte may be a nonaqueous liquid electrolyte (a nonaqueous electrolytic solution) containing a nonaqueous solvent and a supporting salt, since the electrolyte does not limit the technique disclosed herein, a detailed description thereof will be omitted.

An electrode terminal 100 disclosed herein is used as at least one of the positive electrode external terminal 42 and the negative electrode external terminal 44 included in the secondary battery 1. Here, a case where the electrode terminal 100 is used as the negative electrode external terminal 44 will be described. Since a similar configuration will suffice when the positive electrode external terminal 42 is the electrode terminal 100, a detailed description will be omitted.

Figure 3:
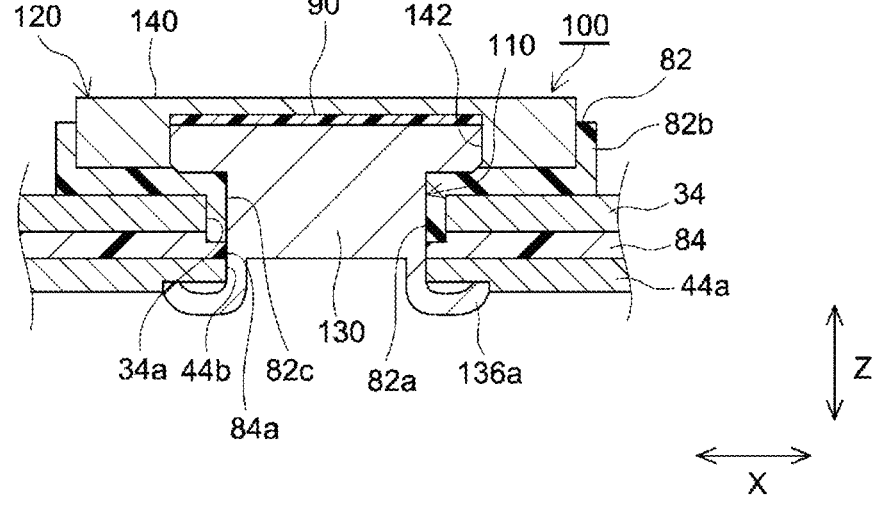
FIG. 3 is a sectional view schematically showing a structure in a vicinity of an electrode terminal of the secondary battery according to the embodiment.
Figure 4:
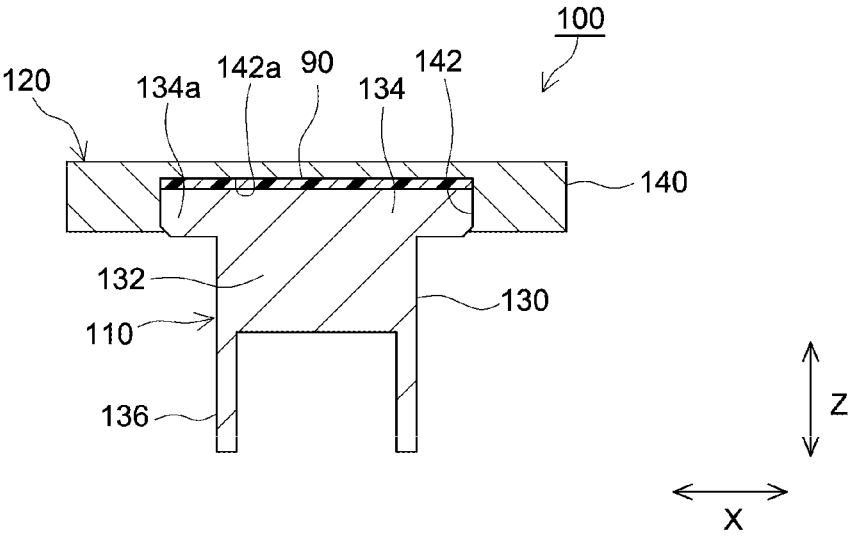
FIG. 4 is a sectional view schematically showing a structure of the electrode terminal according to the embodiment.

As shown in FIGS. 3 and 4, the electrode terminal 100 has a shaft portion 110 and a head portion 120. As shown in FIG. 3, in order to prevent conduction between the electrode terminal 100 and the battery case 30, a gasket 82 and an insulator 84 are arranged between the electrode terminal 100 and the battery case 30 (in FIG. 3, the lid 34).

As shown in FIG. 3, the gasket 82 is an insulating member which is arranged between the electrode terminal 100 and an outer surface of the battery case 30 (an upper surface of the lid 34) and the terminal insertion hole 34a. In addition, the gasket 82 increases air-tightness of the battery case 30 and suppresses both penetration of moisture from outside of the battery case 30 and leakage of an electrolyte solution from inside of the battery case 30. The gasket 82 includes a cylindrical portion 82a which has a through-hole 82c into which the shaft portion 110 of the electrode terminal 100 is to be inserted and a base portion 82b. The cylindrical portion 82a is a portion to be inserted into the terminal insertion hole 34a of the lid 34 and insulates the shaft portion 110 of the electrode terminal 100 and the lid 34 from each other. The base portion 82b is a portion which is coupled to and extends in a horizontal direction from an upper end of the cylindrical portion 82a and which insulates the head portion 120 of the electrode terminal 100 and the upper surface of the lid 34 from each other. The gasket 82 is favorably formed of an insulating resin that can be readily elastically deformed and examples thereof include a fluorine-based resin such as perfluoroalkoxy fluorine resin (PFA), polyphenylene sulfide resin (PPS), and aliphatic polyamide.

As shown in FIG. 3, the insulator 84 is an insulating member which is arranged between an inner surface of the battery case 30 (a lower surface of the lid 34) and the electrode terminal 100 and the negative electrode internal terminal 44a. The insulator 84 has a plate-shaped portion which spreads horizontally along the lower surface of the lid 34 and the plate-shaped portion is provided with a through-hole 84a into which the shaft portion 110 of the electrode terminal 100 is to be inserted. The insulator 84 is formed of a resin material which has resistance with respect to an electrolyte used and an electrical insulating property and which is capable of elastic deformation and, for example, the insulator 84 is constituted of a fluorine-based resin such as perfluoroalkoxy fluorine resin (PFA), polyphenylene sulfide resin (PPS), aliphatic polyamide, or the like.

The shaft portion 110 of the electrode terminal 100 is constituted of a metallic first member 130. While a shape of the first member 130 is not particularly limited as long as the first member 130 can be inserted into the through-hole 82c of the gasket 82, the terminal insertion hole 34a of the lid 34, the through-hole 84a of the insulator 84, and a through-hole 44b of the negative electrode internal terminal 44a, the first member 130 may have a columnar shape, a prismatic shape, or the like. An end of the first member 130 has a connecting portion 134. In the present embodiment, the other end further has a leg portion 136 and a main body portion 132 is present between the connecting portion 134 and the leg portion 136.

The connecting portion 134 of the first member 130 is a portion to be connected to the second member 140 to be described later. While a shape of the connecting portion 134 is not particularly limited, from the perspective of conductivity, a surface area of the connecting portion 134 which comes into contact with the second member 140 is favorably large. Therefore, for example, as shown in FIG. 4, the connecting portion 134 may include a flange portion 134a which extends in an outer diameter direction of the shaft portion 110. In addition, the connecting portion 134 is favorably a plate shape having a surface which comes into surface contact with one surface of the second member 140.

The leg portion 136 of the first member 130 is a portion which is fixed to another member by swaging to realize conduction with the other member. In the present embodiment, as shown in FIG. 3, the electrode terminal 100 is inserted through the through-hole 82c of the gasket 82, the terminal insertion hole 34a of the lid 34, the through-hole 84a of the insulator 84, and the through-hole 44b of the negative electrode internal terminal 44a. In this state, as the leg portion 136 is compressively deformed toward the outer diameter direction by swaging and forms a stud portion 136a, the electrode terminal 100 is fixed to the negative electrode internal terminal 44a. In addition, due to being fixed to each other, the electrode terminal 100 and the negative electrode internal terminal 44a are conductively connected to each other. Furthermore, due to the electrode terminal 100 and the negative electrode internal terminal 44a being fixed to each other, since the gasket 82 and the insulator 84 are pressed and compressed in the height direction Z, air-tightness of the battery case 30 improves. While a shape of the leg portion 136 is not particularly limited as long as the leg portion 136 can be fixed to another member by swaging, from the perspective of uniformity of a compressive force applied in the height direction Z by swaging, for example, a hollow cylindrical shape is favorable.

The head portion 120 of the electrode terminal 100 is constituted of at least a part of the connecting portion 134 of the first member 130 and the second member 140. The second member 140 is a plate-shaped member to be connected to the connecting portion 134 of the first member 130. In the present embodiment, while a shape of a surface of the second member 140 is an approximately rectangular shape as in the case of the negative electrode external terminal 44 shown in FIG. 1, alternatively, the surface of the second member 140 may have a circular shape, a triangular shape, a polygonal shape, or the like.

In addition, as shown in FIG. 4, one surface of the second member 140 is favorably provided with an insertion hole 142 to house at least a part of the connecting portion 134 of the first member 130. Providing the insertion hole 142 enables positioning of the first member 130 and the second member 140 to be readily performed and, furthermore, prevents positional displacement between the first member 130 and the second member 140 in a manufacturing process. Typically, while the insertion hole 142 is a non-through-hole which has a bottom surface 142a, as long as the insertion hole 142 has the bottom surface 142a, the insertion hole 142 may be a through-hole in which a part of the bottom surface 142a penetrates to another surface of the second member 140.

As shown in FIG. 4, at least a part of the connecting portion 134 of the first member 130 and one surface of the second member 140 (including the bottom surface 142a of the insertion hole 142) are bonded by a conductive adhesive 90 and conduction between the first member 130 and the second member 140 is realized. An arrangement location of the conductive adhesive 90 is not particularly limited as long as the conductive adhesive 90 is arranged between the first member 130 and the second member 140.

Although the conductive adhesive 90 is not particularly limited as long as the conductive adhesive 90 has conductivity and adhesiveness, typically, the conductive adhesive 90 contains a conductive material and a thermosetting resin. With such a configuration, since the thermosetting resin irreversibly hardens by being subjected to a heat treatment at a prescribed temperature, the conductive adhesive 90 can bond the first member 130 and the second member 140 to each other. In addition, since the conductive adhesive 90 has conductivity due to containing a conductive material, conductivity between the first member 130 and the second member 140 can be improved.

While the conductive material contained in the conductive adhesive 90 is not particularly limited as long as the material has conductivity, for example, metallic particles or a carbon material can be used. While one of metallic particles and a carbon material are typically used, alternatively, both may be used in combination. The metallic particles are not particularly limited and, for example, one or a combination of two or more selected from silver, copper, nickel, aluminum, gold, molybdenum, tungsten, platinum, palladium, and titanium can be used. Among the above, at least one selected from the group consisting of silver, copper, nickel, aluminum, and gold is favorably used. Using the metallic particles in the group enables further superior conductivity to be realized. While an average particle diameter of the metallic particles is not particularly limited, for example, the metallic particles may be within a range of 0.1 μm to 30 μm. The average particle diameter can be measured based on a laser diffraction scattering method. As the carbon material, various types of carbon black which are known as a conductive material (such as acetylene black, furnace black or Ketjen black), graphite powder, and carbon powder of a carbon nanotube or the like can be used.

A volume ratio of the conductive material among a volume of the entire conductive adhesive 90 is favorably 40% or higher. Accordingly, high conductivity can be realized. In addition, the volume ratio is favorably approximately 80% or lower and may be, for example, 70% or lower. Accordingly, high adhesion strength and conductivity can be realized.

As the thermosetting resin contained in the conductive adhesive 90, for example, one or a combination of two or more selected from phenolic resin, epoxy resin, melamine resin, urea resin, urethane resin, alkyd resin, silicone resin, unsaturated polyester resin, thermosetting polyimide, and thermosetting acrylic resin can be used. Among the above, at least one selected from the group consisting of epoxy resin, urethane resin, silicone resin, and thermosetting acrylic resin is favorably used. Using a thermosetting resin in the group enables further preferable adhesion strength and conductivity to be realized.

As the conductive adhesive 90, for example, CR-2800 manufactured by KAKEN TECH Co., Ltd. can be preferably used.

The electrode terminal 100 disclosed herein can be preferably used even in a case where the first member 130 and the second member 140 are constituted of different metallic materials. Therefore, in accordance with a type of metal constituting another member to be connected to the electrode terminal 100, the metal constituting the first member 130 or the second member 140 can be appropriately changed to the same type of metal. Accordingly, connectivity between the electrode terminal 100 and the other member connected to the electrode terminal 100 can be improved. As a preferable example, when the electrode terminal 100 is used as the negative electrode external terminal 44 as in the present embodiment, the first member 130 is favorably constituted of a copper material and the second member 140 is favorably constituted of an aluminum material. With such a configuration, both a connection between the negative electrode internal terminal 44a constituted of a copper material and the first member 130 and a connection between an external member (for example, a busbar) constituted of an aluminum material and the second member 140 can be made favorable. It should be noted that, in the present specification, an "aluminum material" is a concept encompassing aluminum and alloys using aluminum as a main component. In this case, "an alloy using aluminum as a main component" refers to an alloy of which 70% or more is made of aluminum. While other elements contained in the aluminum alloy are not particularly limited, examples of the elements include silicon, iron, copper, manganese, magnesium, zinc, chromium, titanium, lead, and zirconium. On the other hand, a "copper material" is a concept encompassing copper and alloys using copper as a main component. In this case, "an alloy using copper as a main component" refers to an alloy of which 50% or more is made of copper. While other elements contained in the copper alloy are not particularly limited, examples of the elements include silicon, iron, manganese, magnesium, zinc, chromium, titanium, lead, tin, phosphorus, aluminum, nickel, cobalt, beryllium, or zirconium.

Next, an example of a preferable manufacturing method of the electrode terminal 100 disclosed herein will be described. It should be noted that the manufacturing method of the electrode terminal 100 according to the present embodiment is not limited to the method described below.

The manufacturing method of the electrode terminal 100 disclosed herein includes: a step (hereinafter, also referred to as a "coating step") of preparing the first member 130 and the second member 140 and coating a scheduled adhesion portion of the first member 130 and the second member 140 with the conductive adhesive 90; and a step (hereinafter, also referred to as an "assembly step") of assembling the first member 130 and the second member 140. In addition, when a thermosetting resin is contained in the conductive adhesive 90, the manufacturing method of the electrode terminal 100 disclosed herein further includes: a step (hereinafter, referred to as a "heat treatment step") of hardening the conductive adhesive 90 by a heat treatment. It should be noted that other steps may be arbitrarily included in addition to these steps.

First, in the coating step, a scheduled adhesion portion of the first member 130 and the second member 140 is coated with the conductive adhesive 90. At this point, only one of or both of the first member 130 (specifically, the connecting portion 134) and the second member 140 may be coated by the conductive adhesive 90.

In the assembly step, the connecting portion 134 of the first member 130 need only be pressed against the scheduled adhesion portion with the second member 140.

In the heat treatment step, while conditions of the heat treatment may be appropriately adjusted in accordance with a type of the thermosetting resin contained in the conductive adhesive 90 used, for example, performing a heat treatment of 10 to 120 minutes at 100° C. to 150° C. causes the thermosetting resin in the conductive adhesive 90 to harden and bonds the first member 130 and the second member 140 to each other.

An embodiment of the technique disclosed herein has been described above. However, the embodiment described above merely represents an example of the electrode terminal and the secondary battery disclosed herein and is not intended to limit the technique disclosed herein. For example, a part of the embodiment described above may be replaced with another embodiment to be described later or another embodiment may be added to the embodiment described above. In addition, any technical feature not described as being essential can be deleted when appropriate. Hereinafter, a second embodiment and a third embodiment will be described as other preferred embodiments of the electrode terminal disclosed herein.

Figure 5:
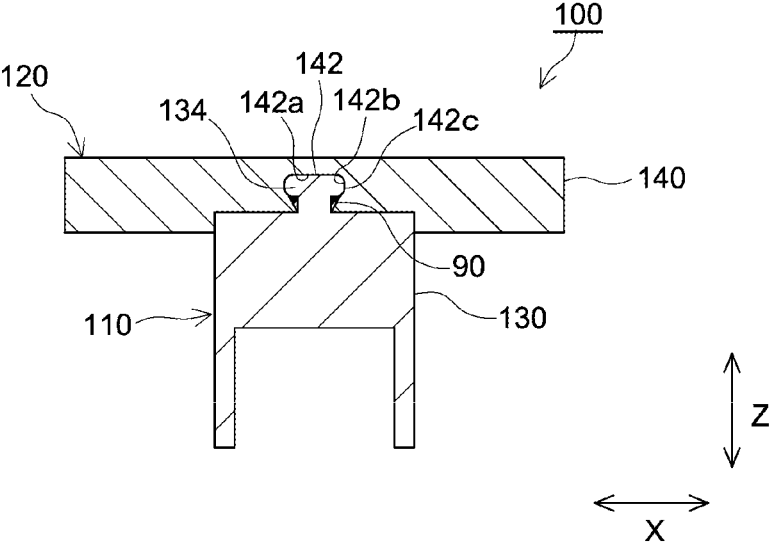
FIG. 5 is a sectional view schematically showing a structure of an electrode terminal according to a second embodiment.

In the second embodiment, as shown in FIG. 5, the second member 140 has an insertion hole 142, and an inner peripheral surface 142b of the insertion hole 142 is provided with a dent 142c. At least a part of the connecting portion 134 of the first member 130 is fitted into the dent 142c. The fitting is realized by, for example, plastically deforming the connecting portion 134 of the first member 130 by applying pressure and press-fitting the connecting portion 134 of the first member 130 into the dent 142c. While an inevitably-occurring gap is created between the dent 142c and the part of the connecting portion 134 fitted into the dent 142c, in the present embodiment, the gap is filled with the conductive adhesive 90. Accordingly, a junction strength and conductivity can be improved. Since the more the gap is filled with the conductive adhesive 90, the greater the effect described above, the gap is favorably entirely filled by the conductive adhesive 90. It should be noted that, since the effect of improving junction strength and conductivity can be obtained as long as the conductive adhesive 90 is arranged in the gap, the gap need not necessarily be entirely filled with the conductive adhesive 90.

A shape of the dent 142c is not particularly limited as long as a part of the connecting portion 134 of the first member 130 can be fitted into the dent 142c. The dent 142c may be provided toward an entire outer diameter direction of the shaft portion 110 of the first member 130 or may be provided only in a specific direction of the outer diameter direction.

While a manufacturing method of the electrode terminal according to the second embodiment is not particularly limited, as an example of a preferable manufacturing method, after filling the dent 142c of the second member 140 with the conductive adhesive 90 in the coating step described above, the connecting portion 134 of the first member 130 is plastically deformed by applying pressure and fitted into the dent 142c in the assembly step. Accordingly, a gap between the dent 142c and the part of the connecting portion 134 having been fitted into the dent 142c can be filled with the conductive adhesive 90. Subsequently, the heat treatment step described above may be performed as necessary.

Figure 6:
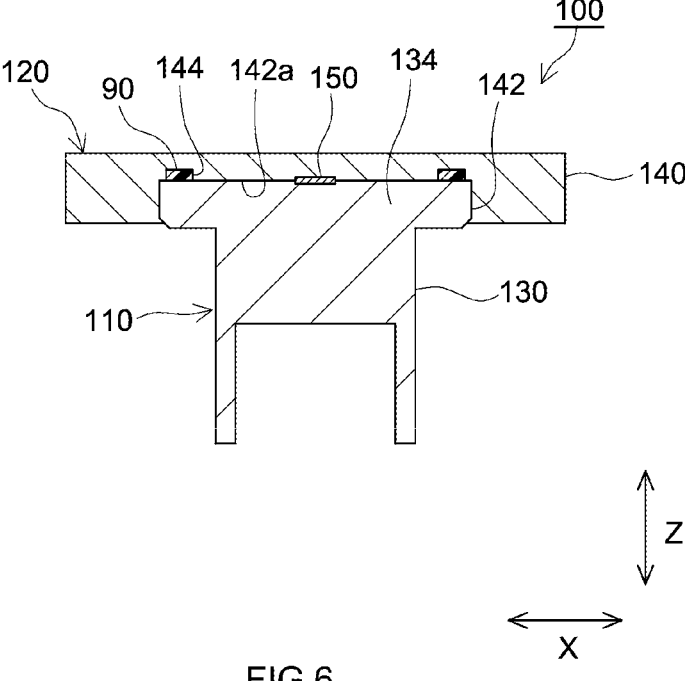
FIG. 6 is a sectional view schematically showing a structure of an electrode terminal according to a third embodiment.

Next, a third embodiment of the electrode terminal disclosed herein will be described. As shown in FIG. 6, in the third embodiment, in addition to adhesion by the conductive adhesive 90, a metallic joining portion 150 in which the first member 130 and the second member 140 are metallically joined to each other is formed at a position that differs from the adhesion position. Accordingly, junction strength and conductivity between the first member 130 and the second member 140 are improved. From the perspective of easiness of formation of the metallic joining portion 150, as shown in FIG. 6, one surface of the second member 140 is favorably provided with an insertion hole 142. Accordingly, since a thickness of the second member 140 in a portion where the insertion hole 142 is provided is reduced, the connecting portion 134 of the first member 130 and the bottom surface 142a of the insertion hole 142 of the second member 140 can be more readily metallically joined to each other.

In the third embodiment, as shown in FIG. 6, one surface of the second member 140 (for example, the bottom surface 142a of the insertion hole 142) is provided with a recessed portion 144 that is filled with the conductive adhesive 90. Accordingly, the conductive adhesive 90 can be arranged at a desired position. In addition, when the connecting portion 134 of the first member 130 is pressed against the second member 140 in the assembly step described above, the conductive adhesive 90 can be prevented from leaking out to a boundary between the first member 130 and the second member 140. Therefore, a formation position of the metallic joining portion 150 where the connecting portion 134 of the first member 130 and the second member 140 are directly metallically joined to each other can be secured. It should be noted that a shape of the recessed portion 144 is not particularly limited and examples thereof may include shapes notched in a cuboid shape, a hemispherical shape, a circular cylindrical shape, a triangular pyramidal shape, or a rectangular cylindrical shape. In addition, one or two or more recessed portions 144 may be provided. Furthermore, one or two or more recessed portions 144 may be provided in a groove shape.

Figure 7:
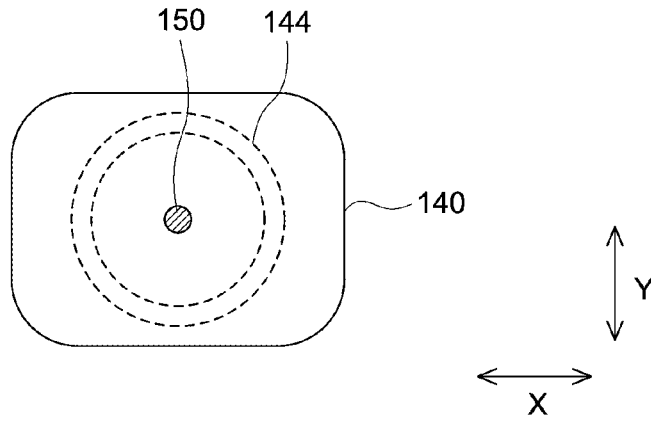
FIG. 7 is a plan view illustrating an example of a positional relationship between a metallic joining portion of the electrode terminal and a recessed portion filled by a conductive adhesive according to the third embodiment.
Figure 8:
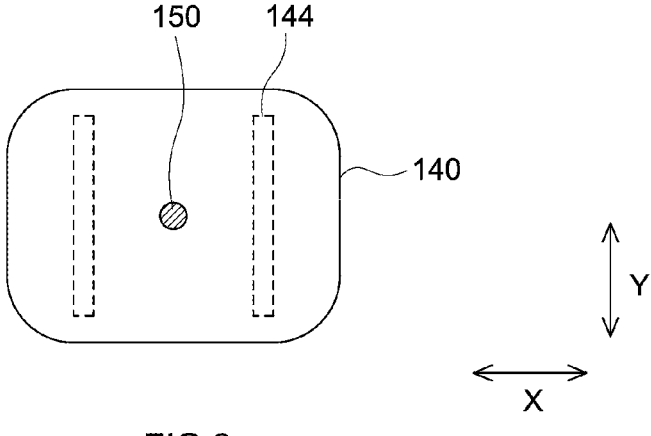
FIG. 8 is a plan view illustrating an example of a positional relationship between the metallic joining portion of the electrode terminal and the recessed portion filled by a conductive adhesive according to the third embodiment.
Figure 9:
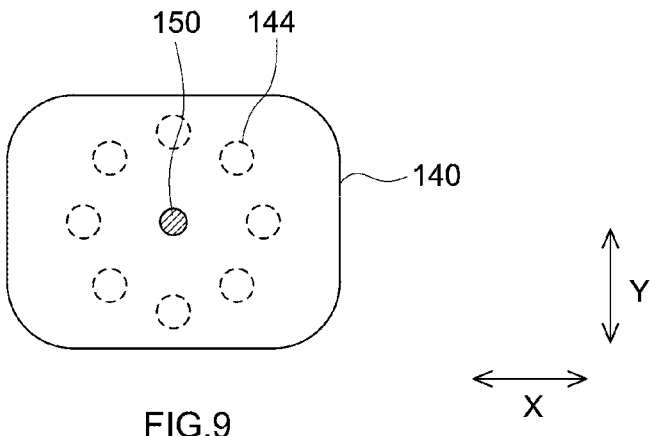
FIG. 9 is a plan view illustrating an example of a positional relationship between the metallic joining portion of the electrode terminal and the recessed portion filled by a conductive adhesive according to the third embodiment.

In addition, one surface of the second member 140 is favorably provided with a recessed portion 144 filled with the conductive adhesive 90 at an outer side position in at least one direction of the width direction X and the depth direction Y than the metallic joining portion 150. Since thermal conductivity of the conductive adhesive is lower than that of metal, when an external member such as a busbar is welded to an outer side than the recessed portion 144, heat input to the metallic joining portion 150 can be suppressed and degradation of the metallic joining portion 150 due to heat can be suppressed. Accordingly, high junction strength and high conductivity can be more preferably maintained. Examples of an arrangement of the recessed portion 144 are shown in FIGS. 7 to 9. FIGS. 7 to 9 are plan views of a surface other than the surface on which the electrode terminal 100 is connected to the first member 130 and the second member 140. In each drawing, a position of the recessed portion 144 having been filled with the conductive adhesive 90 and a position of the metallic joining portion 150 are shown for descriptive purposes and the drawing does not necessary indicate that the recessed portion 144 is actually visible from the surface. It should be noted that positions of the recessed portion 144 and the metallic joining portion 150 are not limited to patterns shown in the drawings.

As shown in FIG. 7, a continuous recessed portion 144 which surrounds the metallic joining portion 150 can be provided. Accordingly, when a welded portion with an external member is provided on an outer side than the recessed portion 144, heat input to the metallic joining portion 150 can be preferably suppressed. In addition, high mechanical strength can be exhibited in both the width direction X and the depth direction Y. While the recessed portion 144 is arranged so as to form a toric shape around the metallic joining portion 150 in FIG. 7, for example, the recessed portion 144 may be arranged in all kinds of shapes including a triangular shape, a square shape, and a polygonal shape. Furthermore, as shown in FIG. 8, the recessed portion 144 may be formed so as to form a linear groove and a similar groove may be arranged on an opposite side so as to sandwich the metallic joining portion 150. By welding an external member to both end sides in the width direction X of the electrode terminal, an amount of the conductive adhesive 90 to be used is reduced and a heat input suppression effect to the metallic joining portion 150 is exhibited. Accordingly, degradation of the metallic joining portion 150 due to heat can be prevented. In addition, as shown in FIG. 9, a plurality of recessed portions 144 may be provided at predetermined intervals around the metallic joining portion 150. Accordingly, an amount of the conductive adhesive 90 to be used can be reduced and high mechanical strength can be exhibited in both the width direction X and the depth direction Y.

In a manufacturing method of the electrode terminal according to the third embodiment, a step (hereinafter, also referred to as a "metallic joining step") of metallically joining the first member 130 and the second member 140 to each other is added in addition to the coating step, the assembly step, and the heat treatment step described earlier. While the metallic joining step can be performed before or after the heat treatment step, the metallic joining step is favorably performed after the heat treatment step. Accordingly, since the first member 130 and the second member 140 have been fixed by the conductive adhesive 90, an occurrence of positional displacement when performing metallic joining can be prevented. In the metallic joining step, according to known methods, for example, the first member 130 and the second member 140 can be metallically joined to each other by ultrasonic joining, diffusion joining, friction pressure welding, laser welding, or resistance welding.

In addition, in the coating step, the recessed portion 144 provided in the second member 140 is favorably filled with the conductive adhesive 90.

While specific examples of the technique disclosed herein have been described in detail, such specific examples are merely illustrative and are not intended to limit the scope of claims. It is to be understood that the technique disclosed herein includes various alterations and modifications of the specific examples described above.

For example, while the first member 130 of the electrode terminal 100 and the negative electrode internal terminal 44a are electrically joined to each other in the embodiment described above, the negative electrode internal terminal 44*a* is not an essential member and the first member 130 and the negative electrode 60 may be directly connected to each other. Such a configuration similarly applies to a case where the electrode terminal 100 is used as the positive electrode external terminal 42 and the first member 130 and the positive electrode 50 may be directly connected to each other.

In addition, the technique according to the second embodiment may be combined with the technique according to the third embodiment. For example, the electrode terminal 100 according to the second embodiment may include one of or both of the recessed portion 144 filled with the conductive adhesive 90 and the metallic joining portion 150.

What is claimed is:

1. An electrode terminal of a secondary battery, the electrode terminal comprising:
   a metallic first member, and
   a metallic plate-shaped second member having a blind hole, wherein
   a bottom of the blind hole has a recessed portion filled with an electrically conductive adhesive,
   the first member has a connecting portion to be connected to the second member,
   the connecting portion of the first member includes a shaft portion, wherein an end of the shaft portion is bonded to the bottom of the blind hole of the second member by the electrically conductive adhesive, and
   at least a part of the connecting portion of the first member is a metallically joined part at the bottom of the blind hole of the second member in a location radially inward from the shaft portion bonded by the electrically conductive adhesive, wherein the metallically joined part is formed by a manufacturing process that includes at least one of ultrasonic joining, diffusion joining, friction pressure welding, laser welding, or resistance welding, and wherein the recessed portion is a continuous groove surrounding the metallically joined part or a plurality of the recessed portions is provided at predetermined intervals around the metallically joining portion, and
   wherein the electrically conductive adhesive contains an electrically conductive material and a thermosetting resin.

2. The electrode terminal according to claim 1, wherein the first member and the second member are constituted of different metals.

3. The electrode terminal according to claim 1, containing metallic particles as the electrically conductive material.

4. An electrode terminal of a secondary battery, the electrode terminal comprising:
   a metallic first member,
   and a metallic plate-shaped second member having a blind hole, wherein
   a bottom of the blind hole has a recessed portion filled with an electrically conductive adhesive,
   the first member has a connecting portion to be connected to the second member,
   the connecting portion of the first member includes a shaft portion, wherein an end of the shaft portion is bonded to the bottom of the blind hole of the second member by the electrically conductive adhesive, and
   at least a part of the connecting portion of the first member is a metallically joined part at the bottom of the blind hole of the second member in a location radially inward from the shaft portion bonded by the electrically conductive adhesive, wherein the metallically joined part is formed by a manufacturing process that includes at least one of ultrasonic joining, diffusion joining, friction pressure welding, laser welding, or resistance welding, and wherein the recessed portion is a continuous groove surrounding the metallically joined part or a plurality of the recessed portions is provided at predetermined intervals around the metallically joining portion,
   wherein the electrically conductive adhesive contains an electrically conductive material and a thermosetting resin,
   the electrically conductive adhesive contains metallic particles as the electrically conductive material, and
   wherein the metallic particles are at least one selected from the group consisting of silver, copper, nickel, aluminum, and gold.

5. The electrode terminal according to claim 1, wherein the thermosetting resin is at least one selected from the group consisting of epoxy resin, urethane resin, silicone resin, and thermosetting acrylic resin.

6. A secondary battery, comprising:
   an electrode body including a positive electrode and a negative electrode;
   a battery case housing therein the electrode body; and
   a positive electrode terminal and a negative electrode terminal electrically connected to the positive electrode and the negative electrode of the electrode body, respectively, wherein
   at least one of the positive electrode terminal and the negative electrode terminal is constituted of the electrode terminal according to claim 1.

7. The electrode terminal according to claim 1, wherein the metallically joined part of the connecting portion of the first member is located at a central axis of the shaft portion.

8. The electrode terminal according to claim 1, wherein the blind hole houses at least a part of the connecting portion of the first member.

9. The electrode terminal according to claim 4, wherein the first member and the second member are constituted of different metals.

10. The electrode terminal according to claim 4, wherein the thermosetting resin is at least one selected from the group consisting of epoxy resin, urethane resin, silicone resin, and thermosetting acrylic resin.

11. The electrode terminal according to claim 4, wherein the metallically joined part of the connecting portion of the first member is located at a central axis of the shaft portion.

12. The electrode terminal according to claim 4, wherein the blind hole houses at least a part of the connecting portion of the first member.

\* \* \* \* \*